(12) United States Patent
Aiello

(10) Patent No.: US 8,157,447 B2
(45) Date of Patent: Apr. 17, 2012

(54) GROOVE CONFIGURATION FOR A FLUID DYNAMIC BEARING

(75) Inventor: Anthony J. Aiello, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 1039 days.

(21) Appl. No.: 12/101,992

(22) Filed: Apr. 13, 2008

(65) Prior Publication Data

US 2009/0257693 A1    Oct. 15, 2009

(51) Int. Cl.
*F16C 32/06* (2006.01)

(52) U.S. Cl. ......... 384/123; 384/100; 384/113; 384/114

(58) Field of Classification Search .................. 384/100, 384/107, 111–115, 123; 29/898.02
See application file for complete search history.

(56) References Cited

U.S. PATENT DOCUMENTS

| | | | | |
|---|---|---|---|---|
| 1,299,799 A * | 4/1919 | Smalley | ......................... | 384/283 |
| 4,875,263 A * | 10/1989 | Furumura | .................... | 29/898.02 |
| 4,961,122 A * | 10/1990 | Sakai et al. | .................... | 384/292 |
| 5,415,476 A * | 5/1995 | Onishi | ........................... | 384/114 |
| 5,516,213 A * | 5/1996 | Moriyama et al. | ............ | 384/292 |
| 5,700,092 A * | 12/1997 | Wasson et al. | ................ | 384/115 |
| 5,908,247 A * | 6/1999 | Leuthold et al. | .............. | 384/114 |
| 6,316,857 B1 * | 11/2001 | Jeong | ............................. | 384/107 |
| 6,417,590 B1 * | 7/2002 | Komura et al. | ............... | 384/107 |
| 7,229,214 B2 * | 6/2007 | Huang et al. | .................. | 384/292 |
| 7,235,168 B2 * | 6/2007 | Heine et al. | .................... | 205/640 |
| 7,625,123 B2 * | 12/2009 | Ishikawa et al. | ............. | 384/100 |
| 7,699,529 B2 * | 4/2010 | Engesser et al. | .............. | 384/115 |
| 7,745,967 B2 * | 6/2010 | Zhang et al. | .................... | 310/85 |
| 2003/0190101 A1 * | 10/2003 | Horng et al. | .................. | 384/278 |
| 2004/0070298 A1 * | 4/2004 | Aiello et al. | .................... | 310/90 |

FOREIGN PATENT DOCUMENTS

JP         06137322 A  *  5/1994

* cited by examiner

*Primary Examiner* — Marcus Charles

(57) ABSTRACT

A groove configuration that improves angular stiffness in a fluid dynamic bearing is provided. A primary groove and a secondary groove are formed on a journal bearing or thrust bearing surface. The secondary groove apex induces a heightened pressure response at a localized area to counteract angular displacement. The primary groove extends a greater circumferential distance about the bearing surface as compared to the secondary groove. The secondary groove apex is also situated closer to an axial end of the journal bearing, or closer to an outer diameter of the thrust bearing, as compared to the primary groove apex. Bearing wear is prevented or minimized under gyroscopic loading. The improved angular stiffness may result in the heads of a storage device being accurately aligned with disc storage tracks. Discs may thus be designed with increased track densities, allowing for smaller discs and increased storage capacity of discs.

9 Claims, 5 Drawing Sheets

GROOVE CONFIGURATION FOR A FLUID DYNAMIC BEARING

BACKGROUND

Disc drive memory systems are being utilized in progressively more environments besides traditional stationary computing environments. Recently, these memory systems are incorporated into devices that are operated in mobile environments including digital cameras, digital video cameras, video game consoles and personal music players, in addition to portable computers. These mobile devices are frequently subjected to various magnitudes of mechanical shock as a result of handling. As such, performance and design needs have intensified including improved resistance to a shock event, improved robustness and reduced power consumption.

Disc drive memory systems store digital information that is recorded on concentric tracks on a magnetic disc medium. At least one disc is rotatably mounted on a spindle, and the information, which can be stored in the form of magnetic transitions within the discs, is accessed using read/write heads or transducers. A drive controller is typically used for controlling the disc drive system based on commands received from a host system. The drive controller controls the disc drive to store and retrieve information from the magnetic discs. The read/write heads are located on a pivoting arm that moves radially over the surface of the disc. The discs are rotated at high speeds during operation using an electric motor located inside a hub or below the discs. Magnets on the hub interact with a stator to cause rotation of the hub relative to the stator. One type of motor has a spindle mounted by means of a bearing system to a motor shaft disposed in the center of the hub. The bearings permit rotational movement between the shaft and the sleeve, while maintaining alignment of the spindle to the shaft.

The read/write heads must be accurately aligned with the storage tracks on the disc to ensure the proper reading and writing of information. Moreover, a demand exists for increased storage capacity and smaller disc drives, which has led to the design of higher recording areal density such that the read/write heads are placed increasingly closer to the disc surface. Precise alignment of the heads with the storage tracks is needed to allow discs to be designed with greater track densities, thereby allowing smaller discs and/or increasing the storage capacity of the discs.

Because rotational accuracy is critical, many disc drives presently utilize a spindle motor having a fluid dynamic bearing (FDB) situated between a shaft and sleeve to support a hub and the disc for rotation. In a hydrodynamic bearing, a lubricating fluid provides a bearing surface between a fixed member and a rotating member of the disc drive. Hydrodynamic bearings, however, suffer from sensitivity to external loads or mechanical shock. In particular, the stiffness of the fluid dynamic bearing is critical so that the rotating load is accurately and stably supported on the spindle without wobble or tilt.

SUMMARY

The present invention provides a novel groove configuration for a fluid dynamic bearing motor. The fluid dynamic bearing contains fluid defined between an inner component and an outer component, wherein the inner component and the outer component are positioned for relative rotation. The groove configuration is defined on at least one of the inner component and the outer component. The groove configuration includes a first primary leg connected to a second primary leg forming a primary apex therebetween. The first primary leg and the second primary leg pump fluid toward, and increase pressure at, the primary apex. The groove configuration also includes a first secondary leg connected to a second secondary leg forming a secondary apex therebetween. The first secondary leg and the second secondary leg pump fluid toward, and increase pressure at, the secondary apex. Additionally, the first primary leg and the second primary leg extend a greater circumferential distance about the fluid dynamic bearing surface as compared to the first secondary leg and the second secondary leg. The secondary apex is also situated closer to an axial end of a journal bearing, or closer to an outer diameter of a thrust bearing, as compared to the primary apex. These and various other features and advantages will be apparent from a reading of the following detailed description.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

A system and method are described herein for providing increased angular stiffness to a journal bearing and a thrust bearing. The bearing grooves of the present invention induce a heightened pressure response at localized areas to counteract any tilting motion or angular displacement of a journal or thrust surface in a fluid dynamic bearing motor. This improved angular stiffness prevents or minimizes bearing wear under gyroscopic loading associated with mobile applications. The improved angular stiffness may result in the read/write heads of a storage device being accurately aligned with storage tracks on a disc. This allows discs to be designed with increased track densities, and also allows for smaller discs and/or increased storage capacity of discs. The present invention may also increase the capacity to sustain a static angular moment load such as a single head on a disc or an odd number of heads loaded on a disc pack.

It will be apparent that features of the discussion and claims may be utilized with disc drives, low profile disc drive memory systems, spindle motors, various fluid dynamic bearing designs including hydrodynamic and hydrostatic bearings, and other motors employing a stationary and a rotatable component, including motors employing conical bearings. Further, embodiments of the present invention may be employed with a fixed shaft or a rotating shaft. Also, as used herein, the terms "axially" or "axial direction" refers to a direction along a centerline axis length of the shaft (i.e., along axis 240 of shaft 220 shown in FIG. 2), and "radially" or "radial direction" refers to a direction perpendicular to the centerline axis 240, and passing through centerline axis 240. "Circumferential" as used herein means in a direction about a fluid dynamic bearing surface about the centerline axis. Also, as used herein, the expressions indicating orientation such as "upper", "lower", "top", "bottom", "height" and the like, are applied in a sense related to normal viewing of the figures rather than in any sense of orientation during particular operation, etc. These orientation labels are provided simply to facilitate and aid understanding of the figures and should not be construed as limiting.

Figure 1:
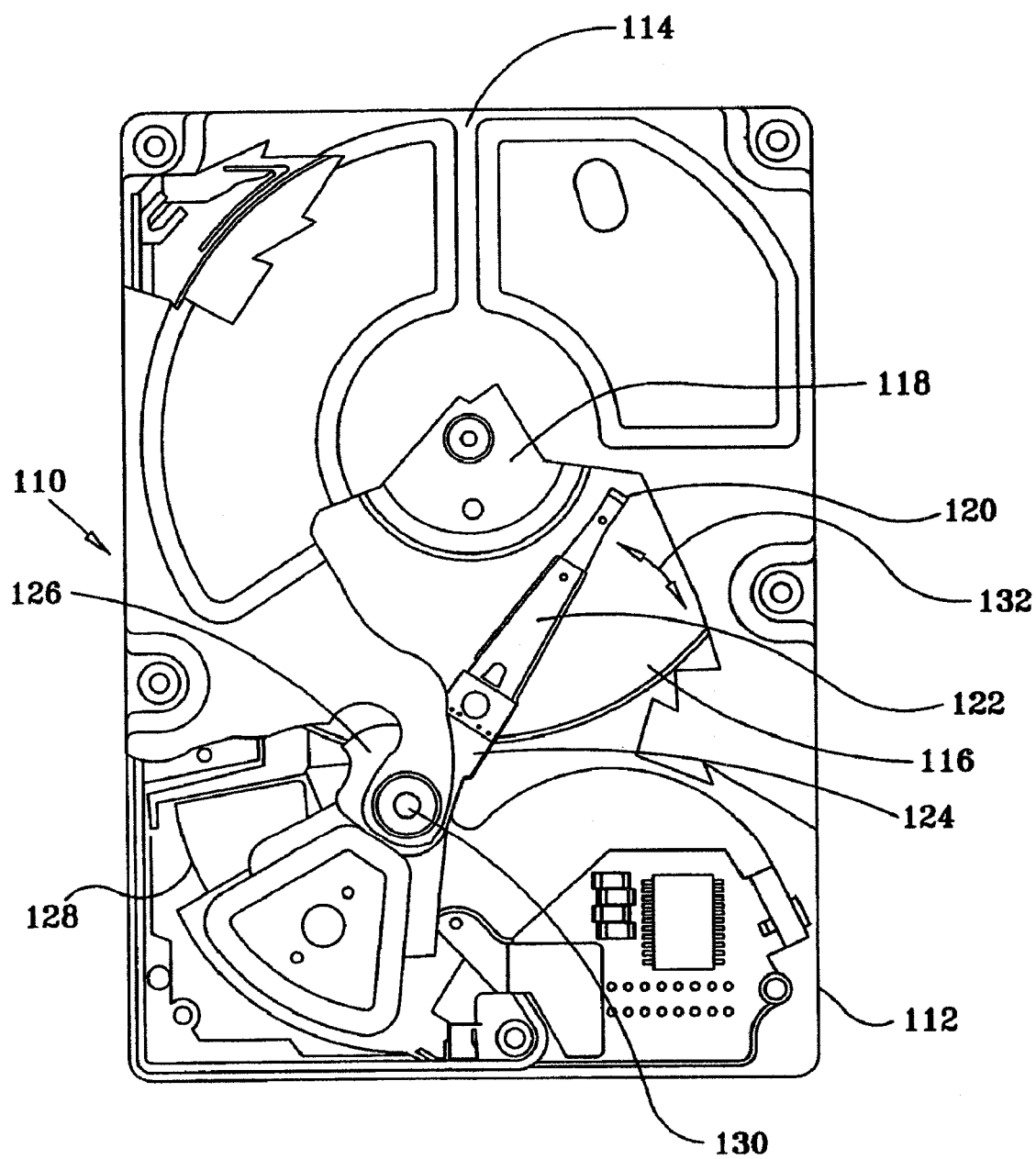
FIG. 1 is a top plan view of a disc drive data storage system in which the present invention is useful, in accordance with an embodiment of the present invention.

Referring to the drawings wherein identical reference numerals denote the same elements throughout the various views, FIG. 1 illustrates a top plan view of a typical disc drive data storage device 110 in which the present invention is useful. Clearly, features of the discussion and claims are not limited to this particular design, which is shown only for purposes of the example. Disc drive 110 includes housing base 112 that is combined with cover 114 forming a sealed environment to protect the internal components from contamination by elements outside the sealed environment. Disc drive 110 further includes disc pack 116, which is mounted for rotation on a spindle motor (described in FIG. 2) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is a rotary moving coil actuator and includes a voice coil motor, shown generally at 128. Voice coil motor 128 rotates actuator body 126 with its attached heads 120 about pivot shaft 130 to position heads 120 over a desired data track along arc path 132. This allows heads 120 to read and write magnetically encoded information on the surfaces of discs 116 at selected locations.

A flex assembly provides the requisite electrical connection paths for the actuator assembly while allowing pivotal movement of the actuator body 126 during operation. The flex assembly (not shown) terminates at a flex bracket for communication to a printed circuit board mounted to the bottom side of disc drive 110 to which head wires are connected; the head wires being routed along the actuator arms 124 and the flexures 122 to the heads 120. The printed circuit board typically includes circuitry for controlling the write currents applied to the heads 120 during a write operation and a preamplifier for amplifying read signals generated by the heads 120 during a read operation.

Figure 2:
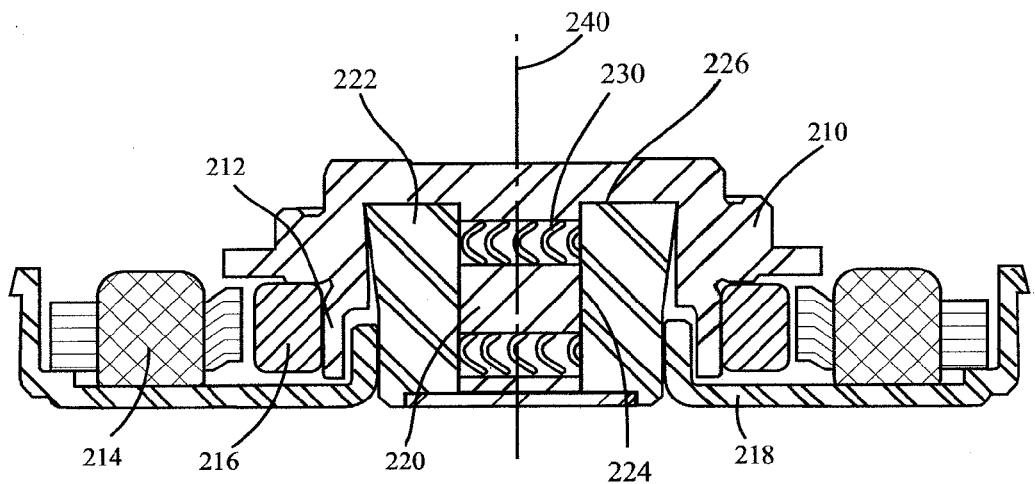
FIG. 2 is a sectional side view of a contemporary fluid dynamic bearing motor used in a disc drive data storage system incorporating a contemporary journal bearing grooving pattern.

Referring to FIG. 2, a sectional side view is illustrated of a fluid dynamic bearing spindle motor as used in a disc drive data storage system 110. The motor includes a rotatable component that is relatively rotatable about a stationary component, defining a journal bearing 224 therebetween. In this example, the rotatable components include shaft 220 and hub 210. Hub 210 includes a disc flange, which supports disc pack 116 (shown in FIG. 1) for rotation about shaft 220. Shaft 220 and hub 210 are integral with backiron 212, although alternatively may be constructed separately. One or more magnets 216 are attached to a periphery of backiron 212. The magnets 216 interact with a stator lamination 214 attached to the base 218 to cause the hub 210 to rotate. Magnet 216 can be formed as a unitary, annular ring or can be formed of a plurality of individual magnets that are spaced about the periphery of hub 210. Magnet 216 is magnetized to form one or more magnetic poles. The stationary components include sleeve 222 and stator lamination 214, which are affixed to base plate 218. A fluid dynamic journal bearing 224 is established between the sleeve 222 and the rotating shaft 220. A thrust bearing 226 is established between hub 210 and sleeve 222. Thrust bearing 226 provides an upward force on hub 210 to counterbalance the downward forces including the weight of hub 210, axial forces between magnet 216 and base plate 218, and axial forces between stator lamination 214 and magnet 216. A fluid, such as lubricating oil fills the interfacial regions between shaft 220 and sleeve 222, and between hub 210 and sleeve 222, as well as between other stationary and rotatable components. While the present figure is described herein with a lubricating fluid, those skilled in the art will appreciate that usable fluids include a lubricating liquid, a lubricating gas, or a combination of a lubricating liquid and lubricating gas.

Typically, one of shaft 220 and sleeve 222 includes sections of pressure generating grooves, including asymmetric grooves or symmetric grooves. FIG. 2 illustrates asymmetric grooves 230 formed on shaft 220 as an example of contemporary grooves. Grooves 230 are illustrated here for understanding that grooves may be formed on the shaft 220, although would not typically appear at this particular sectional view. Asymmetric or symmetric grooves may have a pattern including one of a herringbone pattern and a sinusoidal pattern inducing fluid flow in the interfacial region and generating a localized region of dynamic high pressure and radial stiffness. Further, pressure generating grooves may be formed on a facing surface of thrust bearing 222, as illustrated in FIG. 3B. As shaft 220 rotates, pressure is built up in each of its grooved regions, and shaft 220 supports hub 210 for constant rotation.

Figure 3A:
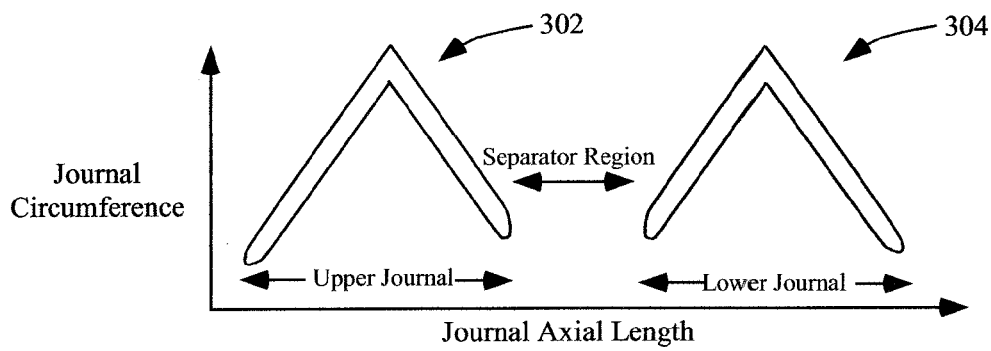
FIG. 3A is a diagrammatic view of a groove configuration from a contemporary grooving pattern that is typically formed on a facing surface of a fluid dynamic journal bearing.
Figure 3B:
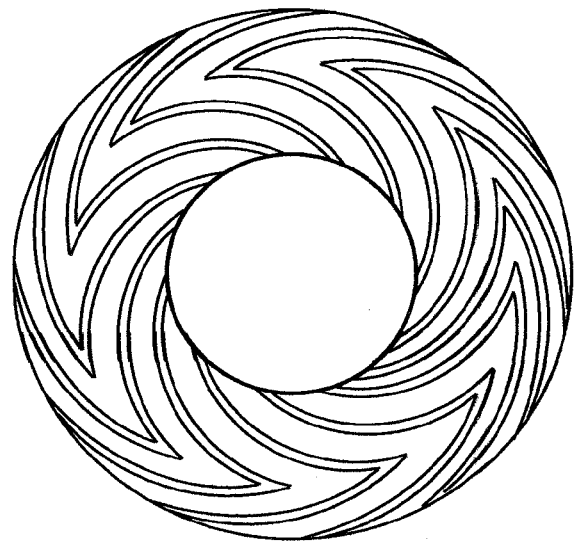
FIG. 3B is a plan view of a contemporary grooving pattern that is typically formed on a facing surface of a thrust bearing.

FIG. 3A illustrates a diagrammatic view of a groove configuration from a contemporary grooving pattern that is typically formed on a facing surface of fluid dynamic journal bearing. Contemporary bearing designs utilize herringbone or sinusoidal grooving patterns in which the grooves consist of two separate legs that mutually pump lubricant toward a central apex (i.e., apexes 302 and 304), where the dynamic pressure builds up, thereby providing the stiffness of the bearing. These grooving patterns are typically situated at an upper and a lower axial portion of the journal bearing, separated by a separator region. These types of bearings, typically known as having a chevron-like shape, are traditionally located on a cylindrical journal surface or an annular thrust surface. This configuration has been used to produce fluid dynamic bearing stiffness to respond to linear excitation forces. In the case of highly local gap closure (i.e., point contact), the bearing grooves induce increased local flow. When the motor is excited by linear forces, bearing gap closure tends to be uniform with the bearing surfaces moving more parallel to each other, producing a pressure increase at the apexes where the bearing fluid converges.

Because memory systems are being utilized in progressively more environments, demands exist for smaller and thinner motors. In response, contemporary designs have shortened journal span and grooves, although maximizing journal bearing length improves bearing stiffness. However, by separating the journal grooves as far apart as possible (as illustrated in FIG. 3A), the restoring moment of the journal bearing pair is improved due to the increase moment arm effect. Still, the shorter journals suffer from lower linear stiffness and therefore the motor's linear response performance is degraded. Further, under both static and dynamic angular excitation forces, which current memory system motors are subjected to, the rotating portion of the motor tilts relative to the stationary portion, causing localized bearing gap closure at the journal bore ends and at the outer diameter of the thrust bearing. Pressure increase, due to bearing gap displacement, occurs predominantly at the groove apexes as opposed to the groove ends. This compromises angular stiffness and results in significant bearing wear under gyroscopic loading associated with mobile applications, and difficulty for the bearing to support static moment loads such as that of a disc drive with a single head or odd-number of read-write heads.

FIG. 3B is a plan view of a contemporary grooving pattern that is typically formed on a facing surface of a thrust bearing. A traditional V-shaped herringbone pattern is shown, although a traditional spiral pattern may alternatively be utilized. These grooving patterns formed on thrust bearing surfaces suffer from the same deficiencies as described above for the journal bearing grooving pattern of FIG. 3A.

Figure 4A:
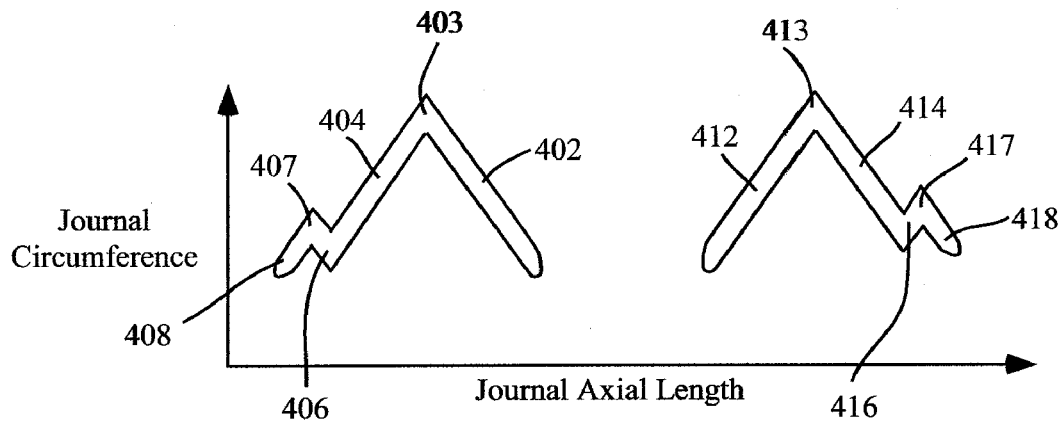
FIG. 4A is a diagrammatic view of a groove configuration from a grooving pattern for a journal bearing surface, illustrating adjoined primary grooves and secondary grooves, in accordance with an embodiment of the present invention.

FIG. 4A shows a diagrammatic view of a groove configuration from a grooving pattern for a journal bearing surface, illustrating adjoined primary grooves and secondary grooves, in accordance with an embodiment of the present invention. A groove configuration is formed on the shaft 220 or the sleeve 222 (FIG. 2) in the form of either indented grooves or raised lands, or both indented grooves and raised lands on the applicable surface. The groove configuration can include a chevron pattern, herringbone pattern, or sinusoidal pattern. In an embodiment, the groove configuration includes a first primary leg 402 connected to a second primary leg 404, forming a primary apex 403 therebetween. The first primary leg 402 and the second primary leg 404 pump fluid toward, and increase pressure at, the primary apex 403. The groove configuration also includes a first secondary leg 406 connected to a second secondary leg 408, forming a secondary apex 407 therebetween. The first secondary leg 406 and the second secondary leg 408 pump fluid toward, and increase pressure at, the secondary apex 407. The first primary leg 402 and the second primary leg 404 extend a greater circumferential distance about the fluid dynamic bearing surface as compared to the first secondary leg 406 and the second secondary leg 408. Also, the secondary apex 407 is situated closer to an axial end of a journal bearing, as compared to the primary apex 403. Further, since a journal bearing includes an upper axial end and a lower axial end, an additional primary apex 413 (formed between first primary leg 412 and second primary leg 414), and an additional secondary apex 417 (formed between first secondary leg 416 and second secondary leg 418) are illustrated as situated at an opposite axial end of the journal bearing.

The first secondary leg 406 and the second secondary leg 408 induce a heightened pressure response at localized areas to counteract any tilting motion or angular displacement of a journal bearing surface. That is, should a bearing gap begin to close due to tilting of the relatively rotatable components, the bearing fluid is pumped into the secondary apexes 407 and 417 where it results in a strong localized pressure response to counteract the tilting motion (i.e., increased angular stiffness) . In an embodiment, the separation of secondary apexes 407 and 417 is maximized, to result in a long moment arm, the squared value of which is proportional to journal bearing angular stiffness.

The first primary leg 402 and the second primary leg 404 are illustrated as connected to the first secondary leg 406 and the second secondary leg 408. Alternatively, as described in FIG. 6, a first primary leg and a second primary leg are formed having a discontinuity with a first secondary leg and a second secondary leg. Also, the first secondary leg 406 extends at an angle in the range of 15 degrees to 30 degrees relative to a circumferential direction about the fluid dynamic bearing. Other angles may alternatively be employed, as described in FIG. 4B. Further, when a groove configuration is formed on a journal bearing surface, in an example embodiment the lengths of the first secondary leg 406 and the second secondary leg 408 are formed in the range of 10 percent to 50 percent of the lengths of the first primary leg 402 and the second primary leg 404. Additionally, in an embodiment, the first primary legs 402 and 412 and the second primary legs 404 and 414 are formed having a longer length than the first secondary legs 406 and 416 and the second secondary legs 408 and 418.

Additionally, the relative circumferential lengths of the groove legs are considered by the present invention to avoid unwanted pumping direction and resulting negative pressure zones in the bearing system. In an embodiment, the sum of the circumferential length of second secondary leg 408 and second primary leg 404 is set greater than the sum of the circumferential length of first secondary leg 406 and first primary leg 402. Alternatively the sum of the circumferential length of second secondary leg 408 and second primary leg 404 is set equal to the sum of the circumferential length of first secondary leg 406 and first primary leg 402, but the journal gap is tapered in a predetermined direction. That is, since a tapered journal gap favors a smaller gap at one journal end, one primary leg will have a smaller gap as compared to the second primary leg, which will result in a predetermined and particular pumping direction.

Figure 4B:
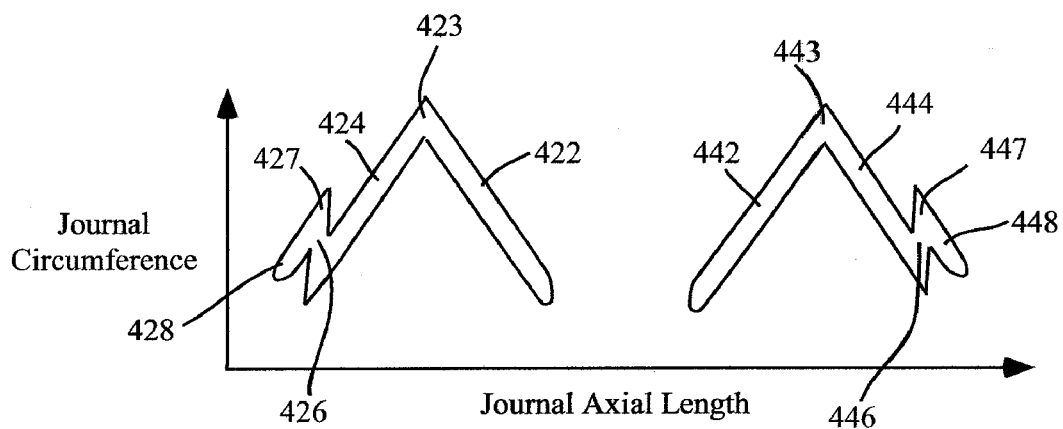
FIG. 4B is a diagrammatic view of a groove configuration from a grooving pattern for a journal bearing surface, illustrating primary grooves and secondary grooves, wherein a leg of the secondary groove extends at a 90 degree angle relative to a centerline axis length of the rotating axis, in accordance with an embodiment of the present invention.

FIG. 4B is a diagrammatic view of a groove configuration from a grooving pattern for a journal bearing surface, illustrating primary grooves and secondary grooves, in accordance with an embodiment of the present invention. Like the embodiment shown in FIG. 4A, the journal bearing includes an upper axial end and a lower axial end. Thus, a primary apex 423 is formed between first primary leg 422 and second primary leg 424, and a secondary apex 427 is formed between first secondary leg 426 and second secondary leg 428. An additional primary apex 443 (formed between first primary leg 442 and second primary leg 444), and an additional secondary apex 447 (formed between first secondary leg 446 and second secondary leg 448) are illustrated as situated at an opposite axial end of the journal bearing. However, in this alternative embodiment, the first secondary leg 426 (or the first secondary leg 446) extends at a 90 degree angle relative to a centerline axis length of the rotating axis. In this configuration, the journal bearing pressure profile steadily increases from the groove ends to the primary apexes 423 and 443.

Figure 5:
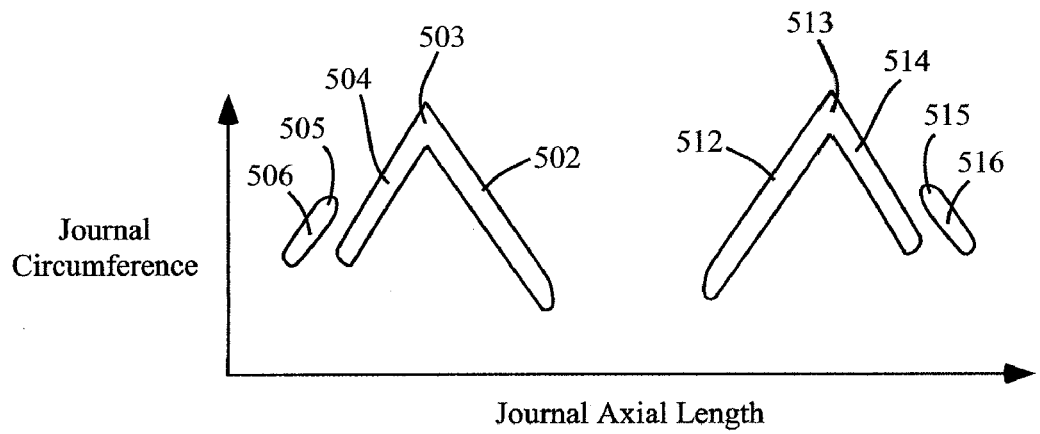
FIG. 5 is a diagrammatic view of a groove configuration from a grooving pattern for a journal bearing surface, illustrating primary grooves each having a corresponding secondary groove with a discontinuity to the corresponding primary grooves, in accordance with an embodiment of the present invention.

As illustrated in FIG. 5, first primary leg 502 and second primary leg 504 are formed having a discontinuity with secondary leg 506, in an alternative embodiment. Again, the journal bearing surface incorporates a corresponding opposite axial end grooving pattern, which includes a primary apex 513 (formed between first primary leg 512 and second primary leg 514), and an additional secondary apex 515 (formed at an end of secondary leg 516). The secondary legs 506 and 516 pump fluid toward, and increase pressure at, the secondary apexes 505 and 515. In this configuration, the journal bearing pressure profile steadily increases from the groove ends to the primary apexes 503 and 513. This single secondary leg 506 may be used when groove space within a journal bearing is significantly limited.

As illustrated, the secondary apexes 505 and 515 are situated closer to the axial ends of the journal bearing, as compared to the primary apexes 503 and 513. Also, the first primary legs 502 and 512 and the second primary legs 504 and 514 extend a greater circumferential distance about the fluid dynamic bearing surface as compared to the secondary legs 506 and 516. Further, in an embodiment, the first primary legs 502 and 512 and the second primary legs 504 and 514 are formed having a longer length than the secondary legs 506 and 516.

Figure 6:
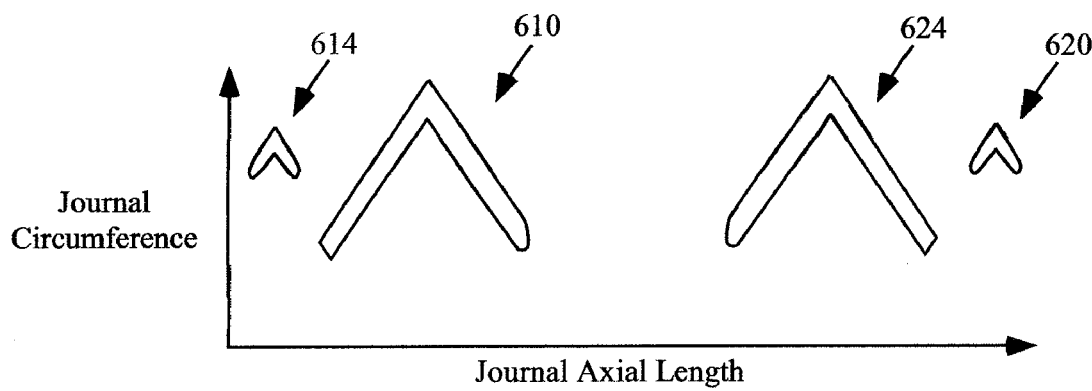
FIG. 6 is a diagrammatic view of a groove configuration from a grooving pattern for a journal bearing surface, illustrating primary grooves and secondary grooves, wherein the secondary grooves are situated a predetermined circumferential distance from an end of the primary grooves, in accordance with an embodiment of the present invention.

Referring to FIG. 6, an alternative groove configuration from a grooving pattern for a journal bearing surface is shown illustrating primary grooves 610 and 624, and secondary grooves 614 and 620. The primary grooves 610 and 624 are formed with a groove discontinuity from the secondary grooves 614 and 620. Also, the legs of the secondary grooves 614 and 620 are situated a predetermined circumferential distance from an end of the legs of the primary grooves 610 and 624.

Figure 7:
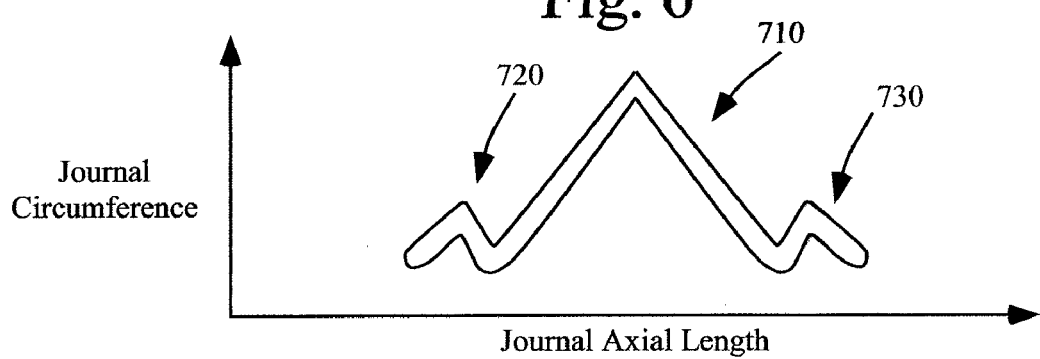
FIG. 7 is a diagrammatic view of a groove configuration from a grooving pattern for a journal bearing surface, illustrating primary grooves, secondary grooves and tertiary grooves, in accordance with an embodiment of the present invention.

FIG. 7 is a diagrammatic view of a groove configuration from a grooving pattern for a journal bearing surface, illustrating primary grooves 710, secondary grooves 720 and tertiary grooves 730, in accordance with a further embodiment of the present invention. It is to be understood that the word "secondary" as used herein with respect to the term "secondary grooves" is not intended to mean or imply that the secondary grooves are of second rank, importance or value as compared to the primary grooves. Likewise, the word "tertiary" as used herein with respect to the term "tertiary grooves" is not intended to mean or imply that the tertiary grooves are of third rank, importance or value as compared to the primary or secondary grooves. The secondary grooves 720 and the tertiary grooves 730 are situated at opposite axial ends of the journal bearing. Like the primary grooves 710 and secondary grooves 720, the tertiary grooves 730 include a first tertiary leg connected to a second tertiary leg, which form a tertiary apex therebetween. Also, the primary grooves 710 extend a greater circumferential distance about the fluid dynamic bearing as compared to the secondary grooves 720 and the tertiary grooves 730.

Figure 8A:
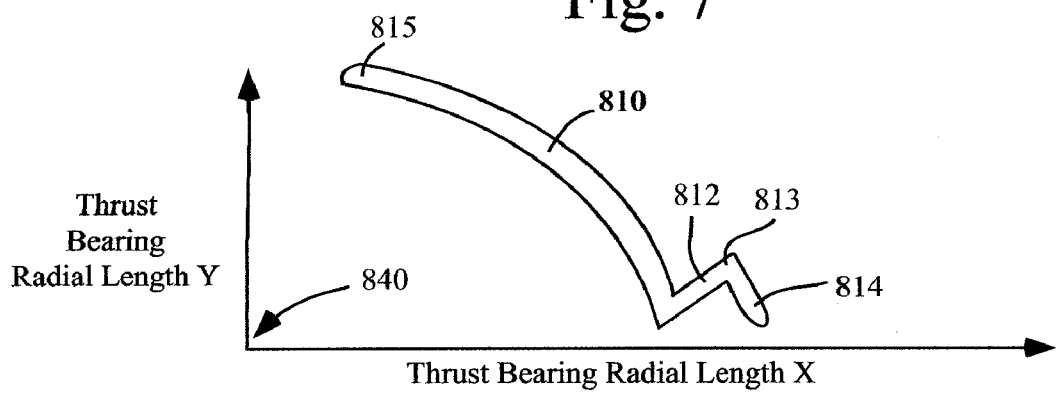
FIG. 8A is a diagrammatic view of a groove configuration from a grooving pattern for a thrust bearing surface, illustrating an adjoined primary groove and secondary grooves, in accordance with an embodiment of the present invention.

Turning now to FIG. 8A, a diagrammatic view is shown of a groove configuration from a grooving pattern for a thrust bearing surface, in accordance with an embodiment of the present invention. Marker 840 points in the direction of the position of the rotating axis. The grooving configuration includes a primary leg 810, a first secondary leg 814, and a second secondary leg 812. The first secondary leg 814 and the second secondary leg 812 form a secondary apex 813 therebetween, and pump fluid toward, and increase pressure at, the secondary apex 813. The primary leg 810 extends a greater circumferential distance about the thrust bearing surface as compared to the first secondary leg 814 and the second secondary leg 812. The first secondary leg 814 and the second secondary leg 812 are situated closer to an outer diameter of a thrust bearing, as compared to the primary leg 810. Also, the secondary apex 813 is situated closer to an outer diameter of a thrust bearing, as compared to the primary apex 815. In an example embodiment, the lengths of the first secondary leg 814 and the second secondary leg 812 are formed in the range of 10 percent to 25 percent of the length of the primary leg 810.

Figure 8B:
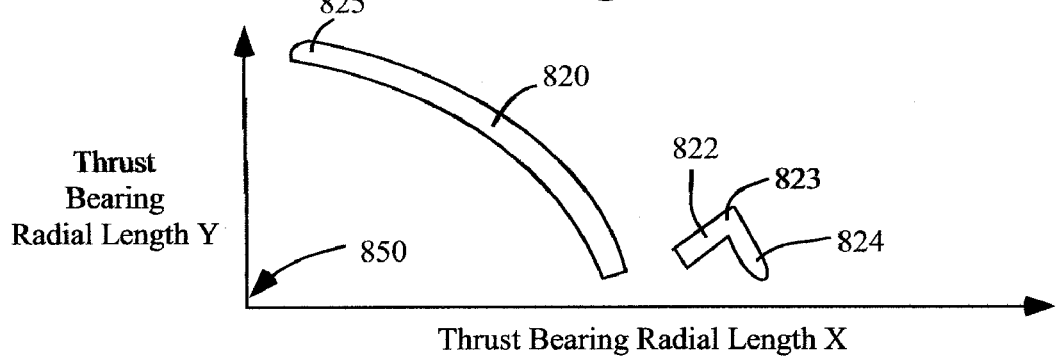
FIG. 8B is a diagrammatic view of a groove configuration from a grooving pattern for a thrust bearing surface, illustrating a primary groove and secondary grooves with a discontinuity, in accordance with an embodiment of the present invention.

FIG. 8B is another diagrammatic view of a groove configuration from a grooving pattern for a thrust bearing surface. Marker 850 points in the direction of the position of the rotating axis. Here, the primary leg 820 is formed with a discontinuity from first secondary leg 822 and second secondary leg 824. The first secondary leg 822 and the second secondary leg 824 form a secondary apex 823 therebetween, and pump fluid toward, and increase pressure at, the secondary apex 823. The primary leg 820 extends a greater circumferential distance about the thrust bearing surface as compared to the first secondary leg 822 and the second secondary leg 824. The first secondary leg 822 and the second secondary leg 824 are situated closer to an outer diameter of a thrust bearing, as compared to the primary leg 820. Also, the secondary apex 823 is situated closer to an outer diameter of a thrust bearing, as compared to the primary apex 825. Further, the first secondary leg 822 and the second secondary leg 824 are situated a predetermined circumferential distance from an end of the primary leg 820.

Figure 9:
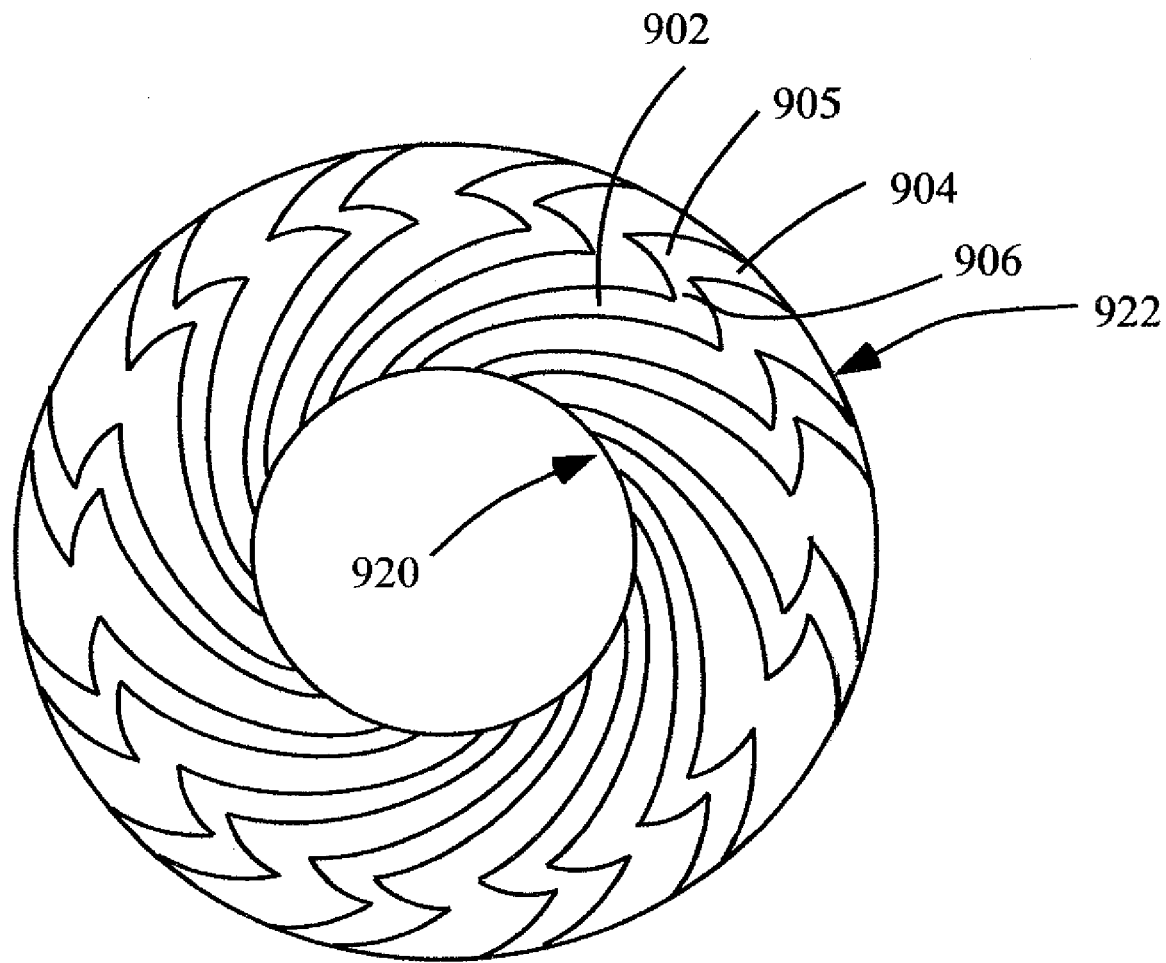
FIG. 9 is a plan view of a grooving pattern formed on a facing surface of a thrust bearing having an adjoined primary groove and secondary grooves, as in FIG. 8A, in accordance with an embodiment of the present invention.

FIG. 9 illustrates a plan view of a grooving pattern formed on a facing surface of a thrust bearing having a primary groove 902 adjoined with secondary grooves 904 and 906, as in FIG. 8A. The groove pattern for primary groove 902 illustrates a spiral pattern beginning at an inside diameter 920 of the thrust bearing, although other patterns may be employed including a herringbone pattern or a sinusoidal pattern. The first secondary leg 906 and the second secondary leg 904 form a secondary apex 905 therebetween, and pump fluid toward, and increase pressure at, the secondary apex 905. Also, the primary leg 902 extends a greater circumferential distance about the thrust bearing surface as compared to the first secondary leg 906 and the second secondary leg 904. The circumferential length of second secondary leg 904 is set greater than the circumferential length of the first secondary leg 906, in an embodiment, for purposes of avoiding negative pressure. Additionally, the first secondary leg 906, the second secondary leg 904 and the secondary apex 905 are situated closer to an outer diameter 922 of a thrust bearing, as compared to the primary leg 902.

Modifications and variations may be made to the disclosed embodiments while remaining within the spirit and scope of the invention. The implementations described above and other implementations are within the scope of the following claims.

I claim:

1. An apparatus comprising:
   a fluid dynamic bearing defined between an inner component and an outer component, wherein the inner component and the outer component are positioned for relative rotation;
   a groove configuration defined on at least one of the inner component and the outer component, wherein the groove configuration comprises:
   a first primary leg connected to a second primary leg forming a primary apex therebetween; and
   a first secondary leg connected to a second secondary leg forming a secondary apex therebetween, wherein
   the first primary leg and the second primary leg pump fluid toward, and increase pressure at, the primary apex,
   the first secondary leg and the second secondary leg pump fluid toward, and increase pressure at, the secondary apex,
   the first primary leg and the second primary leg extend a greater circumferential distance about the fluid dynamic bearing surface as compared to the first secondary leg and the second secondary leg, and
   the secondary apex is situated closer to an axial end of a journal bearing,
   as compared to the primary apex.

2. The apparatus as in claim 1, wherein the first primary leg and the second primary leg are connected to the first secondary leg and the second secondary leg.

3. The apparatus as in claim 1, wherein the first secondary leg and the second secondary leg are situated a predetermined circumferential distance from an end of the first primary leg and the second primary leg.

4. The apparatus as in claim 1, wherein the first secondary leg extends at an angle in the range of 15 degrees to 30 degrees relative to a circumferential direction about the fluid dynamic bearing.

5. The apparatus as in claim 1, wherein the first secondary leg extends at a 90 degree angle relative to a centerline axis length of a rotating axis of one of the inner component and the outer component.

6. The apparatus as in claim 1, wherein the first secondary leg length and the second secondary leg length are in the range of:
   10 percent to 50 percent of the first primary leg length and the second primary leg length, when the groove configuration is formed on a journal bearing surface.

7. The apparatus as in claim 1, wherein the groove configuration further comprises a first tertiary leg connected to a second tertiary leg, forming a tertiary apex therebetween, wherein the first primary leg and the second primary leg extend a greater circumferential distance about the fluid dynamic bearing as compared to the first tertiary leg and the second tertiary leg, and wherein the primary apex is situated between the secondary apex and the tertiary apex.

8. The apparatus as in claim 1, wherein the groove configuration comprises a chevron pattern, a herringbone pattern, or a sinusoidal pattern.

9. The apparatus as in claim 1, wherein the sum of a circumferential length of the second secondary leg and the second primary leg is set greater than the sum of the circumferential length of the first secondary leg and the first primary leg, wherein the second secondary leg is situated closer to the axial end of the journal bearing as compared with the first secondary leg, and wherein the second primary leg is situated closer to the axial end of the journal bearing as compared with the first primary leg.

* * * * *